Nov. 15, 1966  R. L. BAILEY  3,285,454
PLASTIC BOTTLE
Filed Nov. 9, 1964                                   4 Sheets-Sheet 1

INVENTOR.
ROBERT L. BAILEY
BY
ATTYS.

Nov. 15, 1966  R. L. BAILEY  3,285,454
PLASTIC BOTTLE
Filed Nov. 9, 1964  4 Sheets-Sheet 2

INVENTOR.
ROBERT L. BAILEY
BY
Wells & St.John
ATTYS.

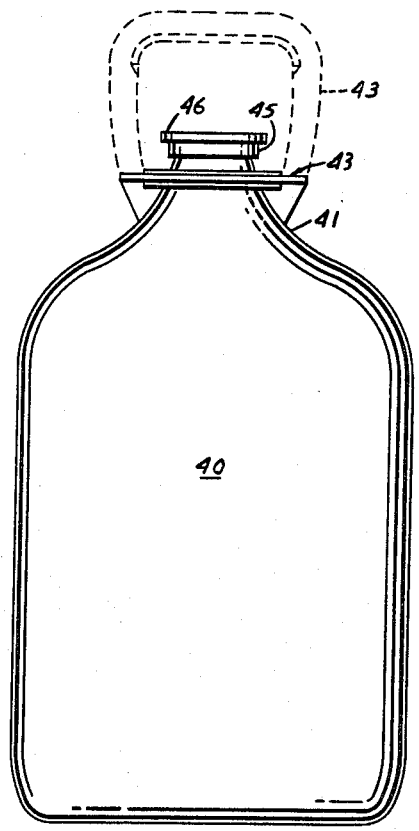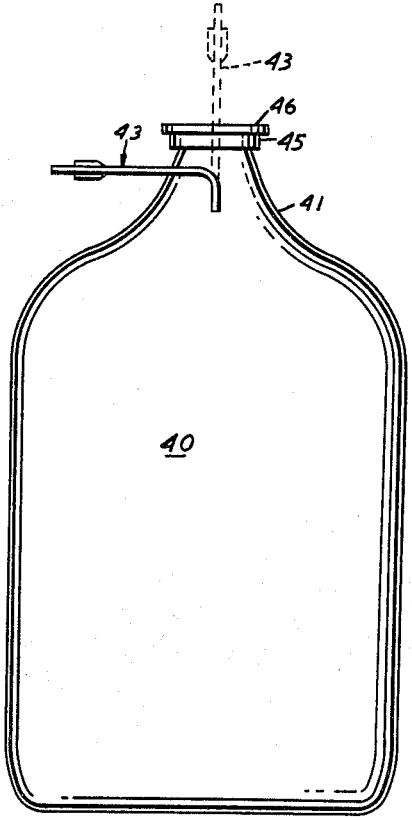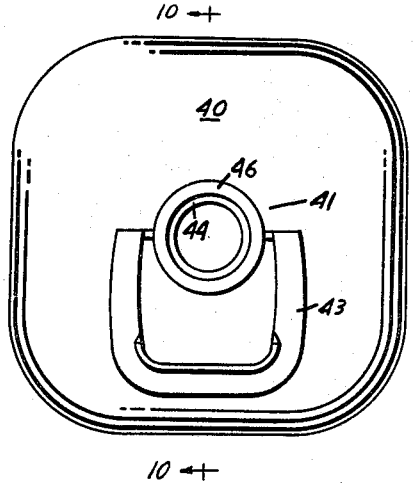

Nov. 15, 1966  R. L. BAILEY  3,285,454
PLASTIC BOTTLE

Filed Nov. 9, 1964  4 Sheets-Sheet 4

INVENTOR.
ROBERT L. BAILEY
BY
ATTYS.

United States Patent Office 3,285,454
Patented Nov. 15, 1966

3,285,454
PLASTIC BOTTLE
Robert L. Bailey, Spokane, Wash., assignor, by mesne assignments, to National Distillers and Chemical Corporation, a corporation of Virginia
Filed Nov. 9, 1964, Ser. No. 411,670
7 Claims. (Cl. 215—100)

This is a continuation-in-part of application Serial No. 243,026 filed December 7, 1962, and now abandoned.

This invention relates to a novel plastic bottle structure.

The present invention is concerned with a plastic jug or bottle such as may be designed particularly for milk. The jug according to the invention, is provided with an integral solid handle formed over the open spout at its upper end. The handle is shaped so as to have no crevices within which bacteria or dirt may be harbored.

The present state of bottles similar to that described herein utilizes in every known instance a removable handle of permanent or temporary material. The glass bottle commonly distributed by the dairy industry in gallon sizes requires a separable handle. The replacement of such handles is entirely eliminated according to the present invention. In addition, the invention provides a usable plastic bottle to replace the glass articles now utilized. This provides a light weight model not subject to breakage and therefore capable of many additional trips between the dairy and the consumer before replacement is necessary.

It is recognized that solid handles have been formed successfully on the sides of containers using injection molding techniques. But when a bottle is blow molded, a handle normally forms a dimple or slight recess at the joinder of the handle and container.

It is a first object of this invention to provide a handle on the top of a bottle that is free from any recess or dimple on the interior bottle surface at the points of joinder between the handle and the bottle.

It is the principal object of this invention to provide a plastic milk bottle with an integral handle over its opening, the bottle being fully compatible with existing dairy machinery for washing, handling, filling and sealing present bottles. In addition, the bottle described herein provides better sealing characteristics and easier pouring than do the present glass bottles of equal capacity.

Another object of this invention is to provide a novel bottle differing from those preceding it in the fact that it is provided with an integral handle. The fact that the handle is formed integrally with the bottle makes this structure compatible with modern sanitization methods in dairies and like operations where complete sterilization of the container is necessitated.

These and further objects will be evident from a study of the following disclosure taken in conjunction with the acompanying drawings which illustrate a preferred embodiment of the finished bottle. It is to be understood that the drawings are exemplary and are not intended to limit or restrict the invention which is set out in the claims that follow the description.

In the drawings:

FIGURE 7 is a side view of a modified version of the bottle, with the carrying position of the handle shown in dashed lines;

FIGURE 8 is a view taken from the side of FIGURE 7;

FIGURE 9 is a top view of the bottle in FIGURE 7;

Figure 1:
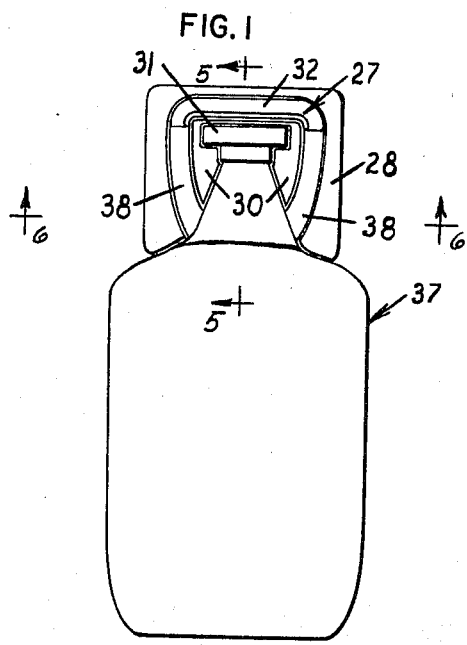
FIGURE 1 is a side view of the bottle as it appears when taken from the mold.

The bottle as taken from a mold is designated by the numeral 37. The bottle of plastic material, such as polyethylene has an integral handle 27 and an exterior web 28 formed of excess plastic from the handle structure 27. There is also an interior web 30 between the handle 27 and the bottle 26. In addition an excess cap structure 31 is provided at the upper closed end of the blown bottle 26. The details of this structure can be better seen in the enlarged sectional views of FIGURE 5 and FIGURE 6.

Figure 2:
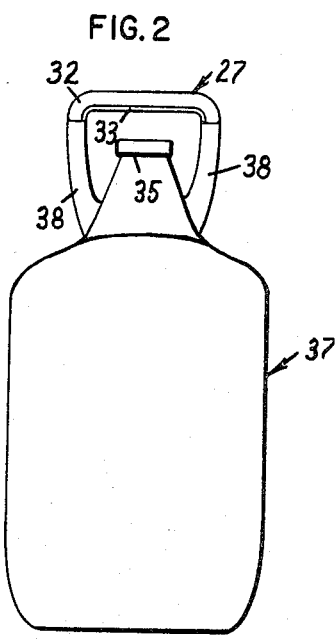
FIGURE 2 is a side view of the bottle after being trimmed of surplus plastic.

The bottle is finished by simple trimming operations whereby the webs 28 and 30 and the excess cap structure 31, are cut from the desired bottle structure, leaving the bottle as shown in FIGURE 2.

Figure 3:
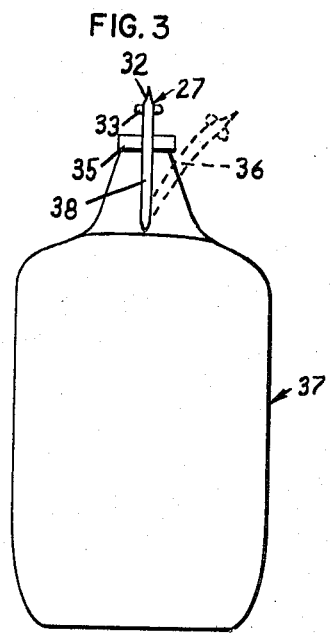
FIGURE 3 is a view taken from the side of FIGURE 2 and illustrating an alternate position of the handle.
Figure 4:
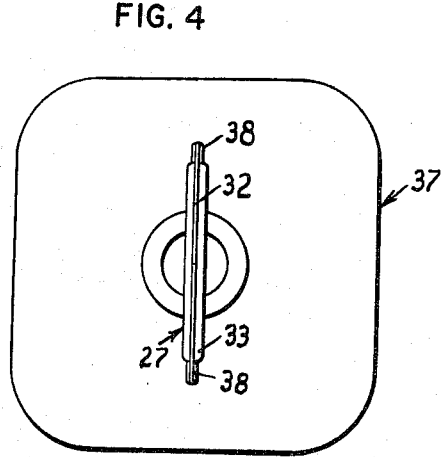
FIGURE 4 is an enlarged top view of the bottle shown in FIGURE 2.

As shown in FIGURES 2, 3 and 4, the finished bottle preferably has a rectangular body structure generally designated as 37. However, it is to be understood that the bottle could be circular or could have another desired cross section. The present invention is primarily concerned with the bottle opening and the handle structure which includes the central tapered web 32 and flange 33 mounted across the legs 38 which extend upwardly and outwardly from the neck of the bottle 37. The flange 33 provides a suitable carrying surface so that a person holding the bottle 37 by the handle will have a comfortable flat surface bearing against his hand.

Figure 5:
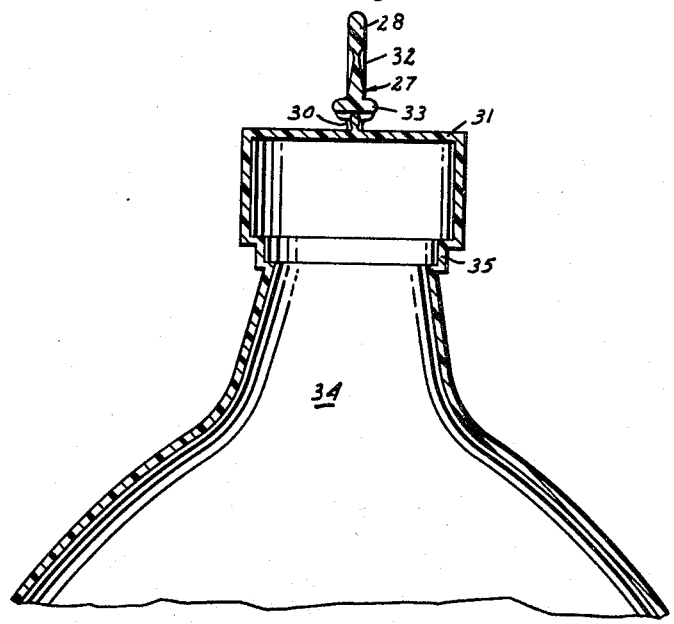
FIGURE 5 is an enlarged sectional view taken along line 5—5 in FIGURE 1.
Figure 6:
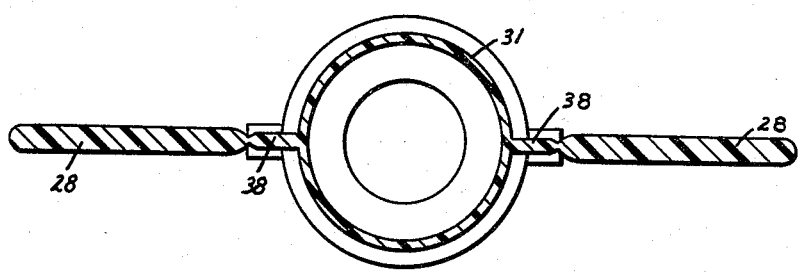
FIGURE 6 is an elarged sectional view on a somewhat smaller scale than FIGURE 5, cut along line 6—6 in FIGURE 1.
Figure 10:
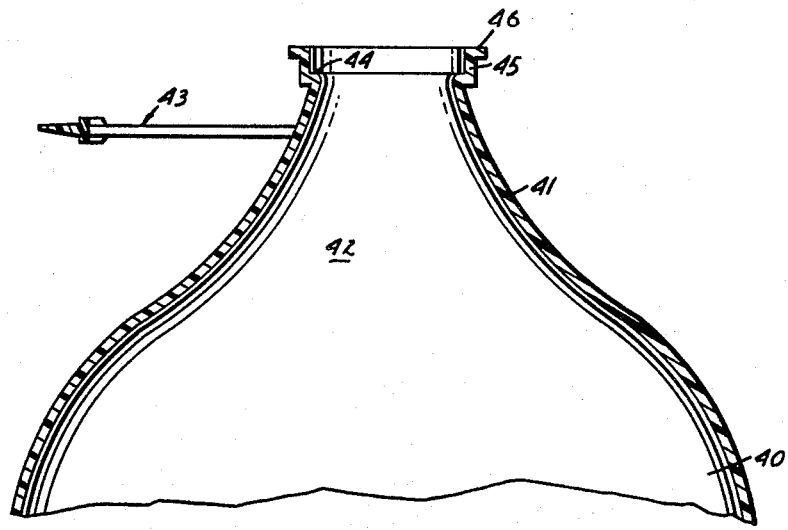
FIGURE 10 is an enlarged fragmentary sectional view taken along line 10—10 in FIGURE 9.
Figure 11:
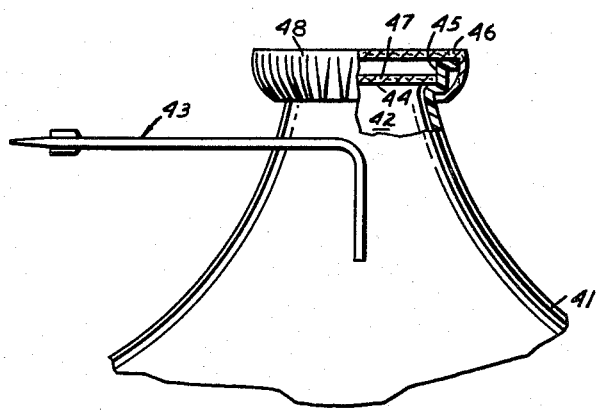
FIGURE 11 is a fragmentary elevation view showing a cap in place on the bottle of FIGURE 7, with a portion of the cap structure and bottle being shown in section.

It is important to note in FIGURE 5 that the inside surface of the bottle designated as 34 is completely smooth and is not interrupted by the handle structure, as is the case with bottles having blown handles. The bottle is provided with a suitable shoulder 35 for the reception of a milk cap but might also be provided with screw threads if a cap screwed on the bottle 37 is desired. The particular neck shape of the bottle illustrated is also exemplary. The handle structure and the process of forming the handle are equally applicable to wide mouth and narrow mouth bottles.

In order that this bottle may be washed by present washing equipment and re-used in the delivery of milk, it is imperative that the junction of the handle legs 38 and the neck of bottle 37 be completely smooth and uninterrupted along the inside bottle surfaces. A reusable milk bottle cannot have a roughened or recessed area at the neck of the bottle, within which bacteria might be sheltered. By properly balancing the volume of material extruded so as to provide excess plastic for the compressive forming of the handle, I have successfully achieved this objective.

It is contemplated that as a final finishing operation, the handle 27 will be bent to an offset position designated as 36 in FIGURE 9, so as to facilitate filling of the bottle 37. However, under the weight of a filled bottle, the semi-rigid handle 27 will normally assume a vertical position as shown throughout the remainder of the drawings.

In FIGURES 7 through 11, there is shown a more refined modification of the basic bottle concept. The bottle illustrated in these figures involves the same basic features previously discussed. However, it provides greater ease in pouring of milk from the container and facilitates proper sealing of the container opening by conventional processes. Although the container could have many different shapes and might be provided with various types of opening configurations, that illustrated in FIGURES 7 through 11 has been practically proven to be most effective in the handling of milk.

As shown in these drawings, the modified bottle 40 would have the same general rectangular configuration previously disclosed and discussed above. However, the neck 41 in this instance is formed with a smooth continuous concave inside surface 42 that continues unbroken to the opening of the bottle located at the top center thereof. The inside surface 42 converges toward the reduced cross section of the bottle opening. There is no break in the surface design of this inner surface between the enlarged square cross section of the body of the bottle 40 and the circular cross section of the opening. As discussed above, there is no dimple, recess, or roughened area at the point at which the handle 43 joins the neck 41. The handle 43 itself is not modified from that previously discussed, although it is shown bent to a location perpendicular to the axis of the bottle 40. Again, when carrying the bottle 40 after being filled with milk, the handle 43 will attain a substantially vertical position over the bottle opening.

The details of the bottle opening in this instance are of substantial importance. The opening includes an inside shoulder 44, a vertical extension 45 surrounding the shoulder 44 and extending upwardly therefrom. The extension 45 terminates at an outwardly directed radial flange 46. The exterior diameter of the flange 46 is greater than the exterior diameter of the extension 45, so that it is protruding outwardly beyond any other section of the opening configuration.

The top surface of flange 46 and the top surface of shoulder 44 are machined in smooth horizontal parallel planes. The inside cylindrical surface of extension 45 is machined, forming sharp perpendicular corners with both the upper surface of shoulder 44 and the upper surface of flange 46. The outside edge of flange 46 is cut in a sharp cylindrical configuration during the trimming of excess material above the opening. Both its upper and lower corners are perpendicular machined edges.

The opening configuration just described provides a shoulder 44 for the reception of a typical cap 47 (FIGURE 11) and outside cover 48. The use of plastic provides an opening of far less thickness than normally results in a glass bottle. For this reason, a smaller diameter cover 48 can be used with a given cap 47, minimizing the overall width of the opening configuration necessary to provide an effective seal. The cap 47 seats in frictional engagement with the inside surface of extension 45 to hold in place, cover 48 crimps over the outside edge of the flange 46, and engages the sharp outside corners of the flange 46 to provide a most effective seal. In fact, cover 48 alone, when applied by conventional machinery, has been found adequate to provide a liquid seal for the contents within bottle 40.

The use of machined surfaces on the shoulder 44, extension 45 and flange 46 insures improved pouring of milk from the bottle 40. The smooth perpendicular surfaces prevent milk from pouring without control by the person using the bottle and interrupts the flow of milk in a sharply defined manner to prevent excess drops from falling from the bottle when pouring has been terminated. The reduced bulk and weight of the plastic bottle 40, the handle 43 and the opening configuration just described, all cooperate to provide a bottle that has better pouring characteristics than a conventional bottle of the same capacity. In addition, the smooth uninterrupted neck 41 eliminates all areas at which bubbles might become entrapped, and ensures a more smooth flow of liquid through neck 41 and out the bottle opening.

Thus I have described a novel bottle having an integral solid handle formed above the opening thereof. The wide use of plastic bottles made of polyethylene and other plastic materials makes such a bottle highly desirable in many industries, particularly in the dairy industry. While only a single bottle has been described in detail, the invention is not to be limited to that particular description except as such limitations appear in the following claims.

Having thus described my invention, I claim:

1. A plastic bottle having an integral handle comprising:
   a hollow body;
   a reduced neck on said body having an axial opening at the outer end thereof, the inner surface of said neck being continuous and uninterrupted;
   and a semi-rigid arched handle of integral one-piece homogeneous construction with said neck extending outwardly from said neck and over said axial opening.

2. A plastic bottle having an integral handle comprising:
   a hollow upright body formed symmetrically about a central vertical axis and having a closed bottom wall;
   a reduced neck on said body formed symmetrically about said axis and having an axial opening at the upper end thereof, the inner surface of said neck being continuous and uninterrupted;
   and a semi-rigid arched handle of integral one-piece homogeneous construction with said neck extending from said neck at diametrically opposite locations, said handle being adapted to pass over the opening of said neck.

3. A bottle as defined in claim 2 wherein the handle in its vertical position over the opening comprises:
   a pair of upstanding legs formed integrally with said neck as a vertical flange extending upwardly and outwardly therefrom;
   and a transverse cross member formed integrally with said legs at the top ends thereof, said cross member having a lower horizontal flange and a central tapered web extending upwardly therefrom.

4. A bottle as defined in claim 2 wherein said body has a rectangular configuration.

5. A bottle as defined in claim 2 wherein the axial opening of the neck comprises:
   a radial shoulder formed at the top of the neck and extending outwardly therefrom;
   a cylindrical extension formed at the radially outer end of said shoulder and extending upwardly therefrom;
   and an outwardly directed radial flange formed at the upper end of said extension.

6. A bottle as defined in claim 2 wherein the axial opening of the neck comprises:
   a radial shoulder formed at the top of the neck and extending radially outward from the inner neck surface, the upper surface of the shoulder being in a plane perpendicular to said axis;
   a cylindrical extension formed at the radially outer end of said shoulder and extending upwardly therefrom;
   and an outwardly directed radial flange formed at the upper end of said extension, the upper surface of said flange being in a plane perpendicular to said axis, the outer edge of said flange being parallel to said axis and forming a perpendicular corner with the upper surface thereof.

7. A bottle as defined in claim 2 wherein the axial opening of the neck comprises:
   a radial shoulder formed at the top of the neck and extending radially outward from the inner neck surface, the shoulder having a smooth machined top surface located in a plane perpendicular to said axis adapted to seat a cylindrical bottle cap;

a cylindrical extension formed at the radially outer end of said shoulder and extending upwardly therefrom, the extension having a smooth machined inner surface having a cylindrical configuration coaxially about said axis, and intersecting the top surface of said shoulder, adapted to frictionally engage the edge of a cap;

and an outwardly directed radial flange formed at the upper end of said extension, the flange having a smooth machined top surface parallel to the top surface of said shoulder and intersecting the inner surface of said extension, the outer edge of said flange being a cylindrical machined surface coaxial to said axis and forming a perpendicular corner with the upper surface of said flange.

References Cited by the Examiner

UNITED STATES PATENTS

| | | | |
|---|---|---|---|
| 803,756 | 11/1905 | Gwynne | 215—11.3 |
| 2,051,940 | 8/1936 | Chichester-Miles | 220—94 |
| 2,099,056 | 11/1937 | Ferngren. | |
| 2,161,993 | 6/1939 | Berch | 215—38 |
| 2,738,114 | 3/1956 | Kahlan | 220—94 X |
| 3,000,527 | 9/1961 | Jennings | 215—100 |
| 3,055,540 | 9/1962 | Ringlen | 150—5 X |
| 3,093,257 | 6/1963 | Miller | 215—100 |
| 3,100,576 | 8/1963 | Frank | 215—1.5 |
| 3,152,710 | 10/1964 | Platte | 215—1.5 |

FOREIGN PATENTS

| | | |
|---|---|---|
| 11,637 | 9/1888 | Great Britain. |

GEORGE O. RALSTON, *Primary Examiner.*

JOSEPH R. LECLAIR, *Examiner.*

D. F. NORTON, *Assistant Examiner.*